United States Patent [19]

Walczak et al.

[11] Patent Number: 5,141,633

[45] Date of Patent: Aug. 25, 1992

[54] REPLACEMENT ROOF DRAIN INSERT COUPLING

[75] Inventors: Thomas W. Walczak, Norfolk; Robert M. Bennette, Millis, both of Mass.

[73] Assignee: Roof Accessories Company, Inc., Medway, Mass.

[21] Appl. No.: 710,093

[22] Filed: Jun. 4, 1991

[51] Int. Cl.[5] .................................. B01D 35/02
[52] U.S. Cl. ........................... 210/163; 285/42; 285/338; 285/346; 210/232; 210/460
[58] Field of Search ............... 210/162, 163, 232, 460; 285/42, 338, 346; 405/121

[56] References Cited

U.S. PATENT DOCUMENTS

| | | | |
|---|---|---|---|
| 377,776 | 2/1888 | Putnam | 285/343 |
| 993,661 | 5/1911 | Dudley | 285/339 |
| 4,035,297 | 7/1977 | Aldridge et al. | 210/163 |
| 4,114,654 | 9/1978 | Richardson | 138/89 |
| 4,505,499 | 3/1985 | Uglow et al. | 285/42 |
| 4,546,789 | 10/1985 | Taylor | 137/245.5 |
| 4,652,321 | 3/1987 | Greko | 285/42 |
| 4,799,713 | 1/1989 | Uglow | 210/163 |

*Primary Examiner*—Peter Hruskoci
*Assistant Examiner*—Robert James Popovics
*Attorney, Agent, or Firm*—Schiller & Kusmer

[57] ABSTRACT

A drain insert having an insert pipe of smaller diameter than the standing drainpipe into which the insert fits, and an elastomeric, tubular sleeve surrounding and seal-bonded to the outside of one end of the insert pipe so that a portion of the sleeve extends axially beyond that end of the insert pipe. A rigid, conical frustum is provided, the smaller end of which frustum is of lesser diameter than the internal diameter of the sleeve, the larger end of which has a diameter greater than the internal diameter of the sleeve but less than the internal diameter of the drainpipe. Coupled to the frustum and extending axially therefrom are a pair of elongated rods adapted to be inserted axially along the insert pipe. The rods are long enough so that when the frustum is adjacent the sleeve, the other ends of the rods, which are threaded, extend outside of the inlet end of the insert pipe and through holes in a bridge to tabs extending across the pipe inlet end. Nuts are threaded onto the threaded ends of the rods, and when turned will bear against the bridge or tabs so as to draw the frustum against the sleeve and expand the latter radially to effect a seal.

18 Claims, 5 Drawing Sheets

REPLACEMENT ROOF DRAIN INSERT COUPLING

This invention relates to roof drains and particularly to roof drain insert couplings for replacement roofs.

Roofs of buildings, particularly flat roofs, require periodic replacement. Because the replacement procedure often raises the roof well above its original level, it is necessary to insure that the roof drains that connect to the downpipes do not pose a threat of leakage of drain water underneath the new roofing material. Often the new roofing is formed of a heavy gauge plastic sheet laid in wide strips over a layer of foamed insulating board placed on the original roof, the strips being bonded to adjoining strips at their edges to form a continuous, water-impermeable covering.

A number of techniques have been developed to couple replacement roof drains with existing drainpipes, the latter typically being exemplified by a 4" ID black iron pipe. Such a replacement drain usually includes an elongated pipe portion of lesser diameter than the drainpipe so as to be axially insertable in the latter. The drain also usually includes some means for sealing the elongated smaller pipe within the drainpipe to positively block any leakage between the two interconnected members.

A typical example of a prior art roof drain insert coupling is described and claimed in U.S. Pat. No. 4,505,499 issued Mar. 19, 1985 to M.S. Uglow et al. Basically, the Uglow et al. system employs a coupling comprising a compressible elastomeric tube, one portion of which is insertable into the drainpipe, another portion of which is insertable into the smaller diameter pipe portion of the drain insert. Means, typically in the form of a series of elongated threaded screws, are disposed in an array engageable from within the drainpipe so that when the screws are turned, the elastomeric tube is axially compressed and thus expands radially outwardly to form a seal between the smaller diameter pipe and the inner surface of the drainpipe.

While commercial embodiments of the insert coupling described in the Uglow et al. patent have achieved some commercial success, there are nevertheless some disadvantages to that system. The coupling assembly of Uglow et al. typically is made of a large number of parts, and is expensive to fabricate. Unless the coupling is firmly preinstalled or coupled to the smaller diameter pipe by at least partially tightening the compression screws, upon insertion of the coupling into the larger diameter drainpipe, one runs the risk that the coupling will either slip off the smaller diameter pipe and drop into the drain pipe, or that the screws have been tightened so much that the expanded elastomer interferes with insertion of the coupling into the larger diameter drainpipe. Particularly, the installation of the Uglow et al. system also requires that the installer insert a very long tool down the drain insert to reach and manipulate the array of screws that must be turned to provide the necessary axial compression of the compressible elastomeric tube. This chore can be quite difficult because the interior of the insert is not well illuminated and inserting the tool into the bolt ends can be a formidable task. Also, it is necessary to be continuously aware that one must avoid dropping the elongated tool into the drainpipe, for the tool will be surely lost. Lastly, it should be noted that the expansion of an elastomeric body to effect the seal is achieved obliquely, for Uglow et al require compression of an elastomeric body to induce expansion of the latter in a direction normal to the compressive force.

A principal object of the present invention is, therefore, to overcome the shortcomings noted above with respect to the prior art, by providing novel means for coupling a drain insert to a drainpipe so that the latter are sealably connected to one another simply and inexpensively. Another object of the present invention is to provide such a coupling in which a seal can be effected between a drain insert and drainpipe by engagement of a tool and threaded element readily accessible outside of the body of the coupling. Yet another object of the present invention is to provide such a coupling in which a seal is effected simply by exerting a radially expansive force on an elastomeric tube.

Other objects of the present invention will in part be obvious and will in part appear hereinafter. The invention accordingly comprises the apparatus possessing the construction, combination of elements and arrangement of parts which are exemplified in the following detailed disclosure and the scope of the application of which will be indicated in the claims. For a fuller understanding of the nature and objects of the present invention, reference should be had to the following detailed description taken in connection with the accompanying drawings wherein:

Generally, the present invention is embodied in a coupling for sealably connecting a drain insert having an insert pipe of predetermined outside small diameter within a standing drainpipe of relatively larger internal diameter, the coupling comprising an elastomeric, tubular sleeve surrounding and seal-bonded to the outside of one end of the insert pipe so that a portion of the sleeve extends axially beyond that end of the insert pipe. A rigid, conical frustum is provided, the smaller end of which is of the same or slightly lesser diameter than the internal diameter of the sleeve, the larger end of which has a diameter greater than the internal diameter of the sleeve but less than the internal diameter of the drainpipe. Coupled to the frustum and extending axially therefrom are elongated means for moving the smaller end of the frustum axially along the sleeve and into radial contact with the interior of the sleeve so as to distort uniformly and substantially radially the sleeve portion extending beyond the end of the insert pipe. To this end, the means for moving the frustum is typically in the form of a pair of elongated rods, respective one ends of which are connected, as by welding, to the frustum, the rod being adapted to be inserted axially along the insert pipe. The rods are long enough so that when the frustum is adjacent the sleeve, the other ends of the rods extend outside of the inlet end of the insert pipe. The means for moving the frustum also includes threading of the rod ends extending out of the inlet end of the insert pipe, those rod ends extending through holes in a bridge across that inlet end. Nuts are threaded onto the threaded ends of the rods, and when turned will draw the frustum against the sleeve and distort the latter to expand radially to effect a seal.

Figure 1:
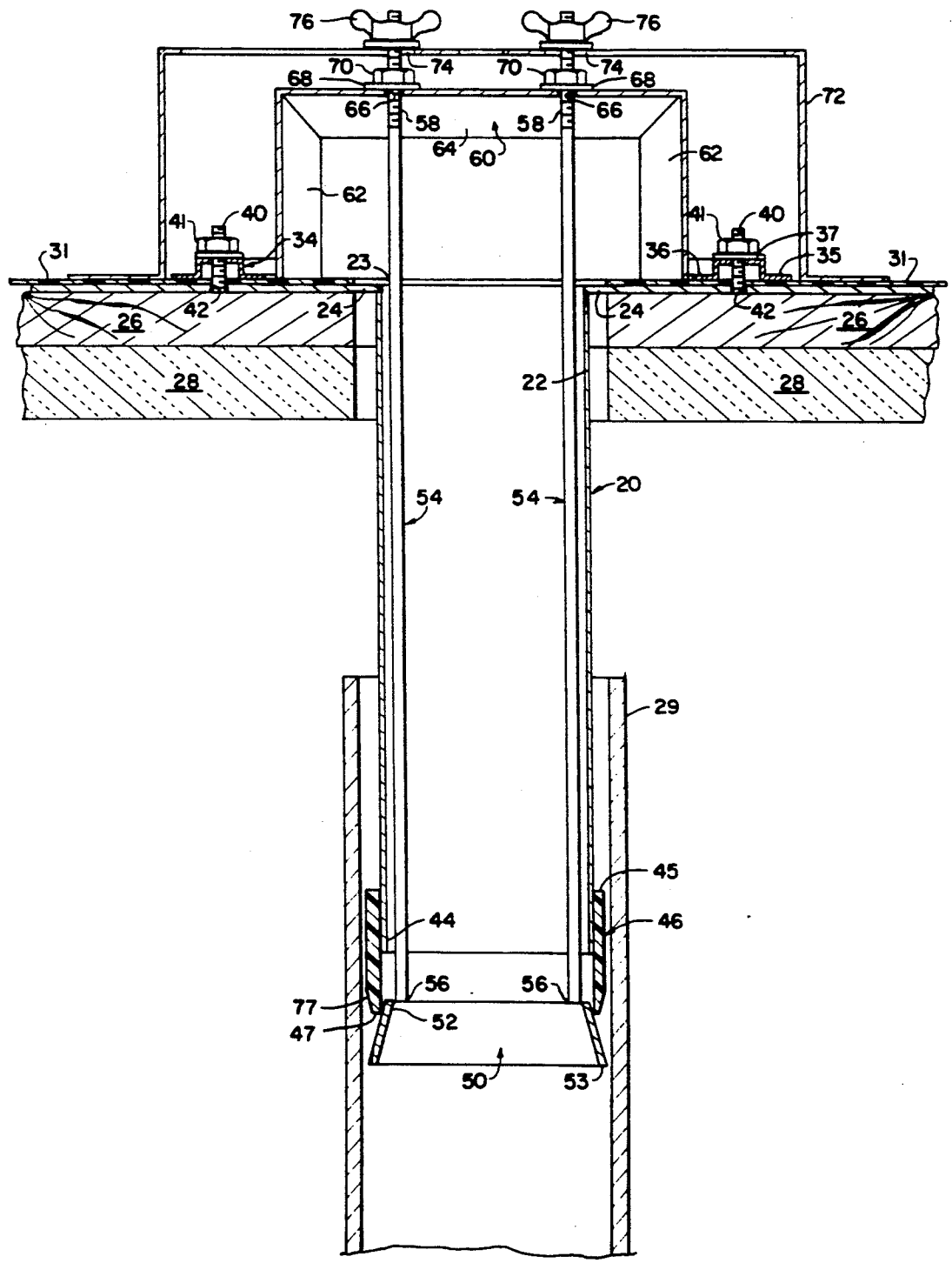
FIG. 1 is a cross-section taken along the long axis of one assembled embodiment of the elements of the present invention.
Figure 2:
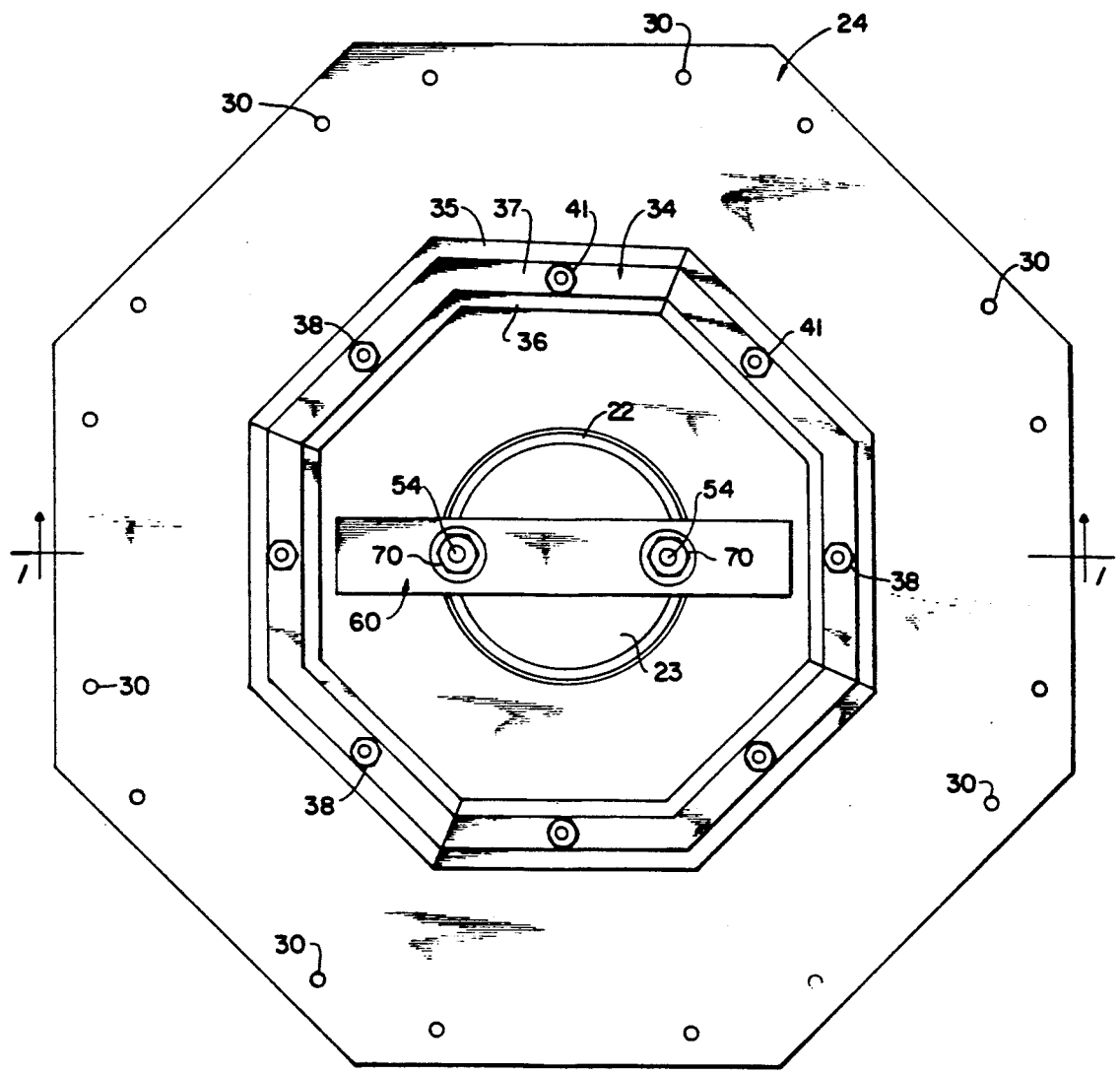
FIG. 2 is a plan view of the top of the assembled embodiment of the present invention shown in FIG. 1, but with the drain strainer removed.
Figure 3:
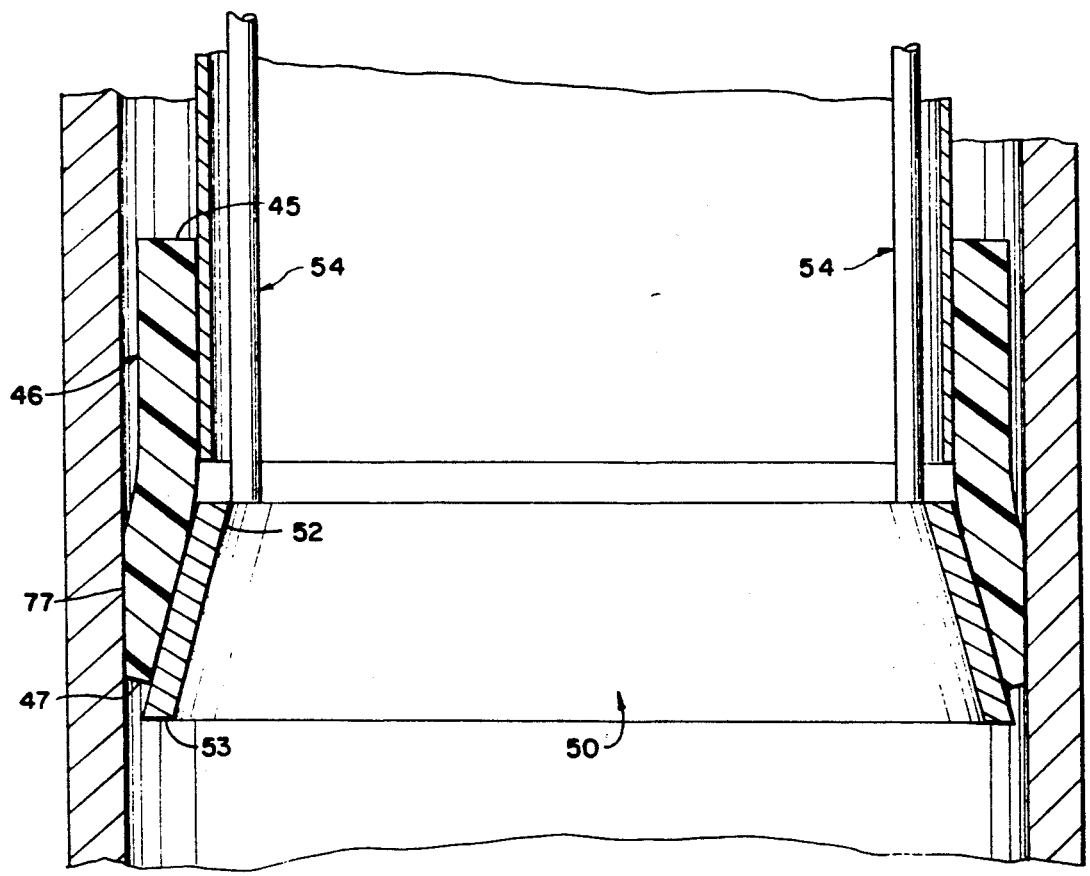
FIG. 3 is an enlarged cross-sectional view showing the seal provided by the embodiment of FIG. 1 when the sleeve is radially expanded.

The novel drain insert 20 of the present invention as shown particularly in FIGS. 1 through 3 inclusive, essentially includes elongated insert pipe 22, typically made of a polymeric material or metal such as aluminum or the like, inlet end 23 of pipe 22 being sealed to and surrounded by flange 24 preferably made of the same material. Flange 24 extends outwardly from pipe 22 substantially normal to the axis of elongation of the latter, and is intended to overlie an apertured wooden sheet or nailer 26 placed adjacent the edge of layer 28 of the new roofing. It will be apparent that on installation, as shown, insert pipe 22 is intended to extend through the aperture in sheet 26 and a congruent aperture in the underlying insulation layer into an existing drainpipe 29. Flange 24 can be affixed to sheet 26 by nails or screws inserted through predrilled holes 30 provided adjacent the periphery of the flange.

Typically, on top of layer 28 there is provided sealing membrane or sheet 31, typically 45 mil polyvinylchloride, polyethylene or the like, extending over the top of flange 24 and provided with an aperture 32 congruent with inlet end 23. Means, in the form of substantially rigid compression ring 34, are included for providing a water-tight seal about the periphery of aperture 32 so that no moisture can leak between flange 24 and sheet 31. To this end, ring 34 is shaped octagonally, and in cross-section as comprising a pair of spaced-apart, coplanar, flat rings 35 and 36, joined by parallel, non-coplanar third ring 37. Ring 37 is provided with a plurality of apertures 38 through which threaded bolts 40 can be inserted to couple with corresponding tapped holes 42 in flange 24. It will be apparent that by tightening nuts 41 threaded onto bolts 40, rings 35 and 36 will draw tightly against sheet 31 forming a pair of concentric twin lines of contact with sheet 31, sealing the latter between flange 24 and ring 34. It will be understood that the utility of the present invention is not limited to the roofing system thus described but that the present invention finds utility as well with other roofing systems such as built-up roofing, modified bitumen and other single ply roofing systems, for example.

Outlet end 44 of drain pipe 22 has coaxially and permanently seal-bonded thereto one end 45 of elastomeric, cylindrical tube or sleeve 46. Sleeve 46 is preferably formed of a water-impermeable, relatively highly flexible, elastic material (e.g., 50 durometer hardness) such as polyurethane or the like, and has an inner diameter that matches the outer diameter of insert pipe 22 so that one end of the sleeve fits very snugly about pipe 22, being typically heat or adhesively bonded to pipe 22 so as to form a permanent, strong, waterproof seal between the pipe and the sleeve. Sleeve 46 is axially dimensioned so that the other end 47 thereof extends substantially axially beyond the tip of end 44 of pipe 22. Sleeve 46 has an outer diameter that is slightly less than the interior diameter of drainpipe 29. Typically then, for example, because with a 4"ID drainpipe one would employ an insert pipe of about 3⅛" OD, the nominal thickness of the wall of sleeve 46 would be typically about 7/32", thus allowing sufficient clearance 48 to permit the assembly of insert pipe 22 and sleeve 46 to readily be inserted in a drainpipe of the stated diameter.

A sleeve of the thickness and diameter above noted would typically have an axial length of between about 4 to 12", typically 8", about half of which would extend along the outer surface of pipe 22.

The novel drain insert of the present invention also includes rigid, conical frustum 50. To insure stiffness, frustum 50 is preferably made of a metal such as aluminum with a wall thickness of typically about 0.125", but can be made of strong synthetic polymers such as ABS and the like as well. The smaller end 52 of frustum 50 has a diameter less than the internal diameter of sleeve 46, larger end 53 of frustum 50 having a diameter greater than the internal diameter of sleeve 46 but less than the internal diameter of drainpipe 29. Typically, the conical angle of frustum 50 can be between about 2° and about 45°, but preferably is in the range between about 3° and about 10°. Connected to frustum 50, typically at the smaller end thereof, are elongated means such as rods 54. Respective ends 56 of rods 54 are connected as by welding or the like diametrically across from one another at end 52 of the frustum and extending parallel to the axis of symmetry of frustum 50 along the interior of insert pipe 22. Rods 54 are dimensioned in length so that when frustum 50 is disposed adjacent sleeve 46, the other ends 58 of rods 54 extend well beyond and out of inlet end 23 of insert pipe 22.

Means are provided for so engaging ends 58 of rods 54 as to move the latter upwardly and thereby draw frustum 50 into radial contact with end 47 of sleeve 46 sufficiently so as to distort the latter radially. To this end, drain insert 20 includes rigid, U-shaped bridge 60 having a pair of legs 62 and cross-beam 64 supported by legs 62. Bridge 60 is intended to be mounted on flange 24 so that legs 62 straddle inlet end 23 of pipe 22 with beam 64 extending across inlet end 23 but spaced outwardly therefrom. A pair of holes 66 are provided transversely through beam 64, spaced apart from one another by about the same distance as ends 56 of rods 54 are spaced from one another, holes 66 having internal diameters great enough to allow at least ends 58 of rods 54 to extend therethrough. Ends 58 preferably are threaded and when extended through holes 66 are intended to be engaged by washers 68 and nuts 70.

In a preferred embodiment, threaded ends 58 extend outwardly well beyond the position wherein nuts 70 can be screwed down to beam 64. Consequently, drain strainer 72 is provided in the form of an inverted, apertured bowl, intended to be mounted above drain insert 20 and extending almost to the periphery of flange 24, for preventing flow of debris into the drainpipe. The center portion of drain strainer 72 is provided with one or more openings 74 through which rod ends 58 can extend. By mounting wing nuts 76 or the like onto rod ends 58 and turning the wing nuts until they contact drain strainer 72, one can secure the latter firmly to drain insert 20.

To install the novel drain insert, the roof in which drain insert 20 is to be placed, is covered, typically with a layer 28 of insulating board and an apertured nailer 26 of plywood is placed around the inlet end of drainpipe 29. Rods 54 are inserted through outlet end 44 of insert pipe 22 so that frustum 50 is adjacent sleeve 46. Rod ends 58, which extend out of inlet end 23 of insert pipe 22, are inserted through holes 66 in bridge 60. The bridge is secured lightly to flange 24 by threading nuts 70 onto rod ends 58. Insert pipe 22 of drain insert 20 and the connected frustum 50 are then placed into drainpipe 29. The bottom side of flange 24 is secured against sheet 26 by driving screws through holes 30 into sheet 26.

The roofer now can install sheet 51 over the roof and the drain insert, first, of course, cutting an appropriate aperture in the sheet to permit bridge 60 to extend above the plane of the roof and to provide access to the inlet end 23 of insert pipe 22. Compression ring 34 is now installed by inserting bolts 40 and tightening the latter down so that the compression ring tightly locks sheet 31 against flange 24. Typically, caulking is applied around the outer periphery of ring 34 to form a protective gasket. Nuts 70 are then turned until rods 54 have drawn frustum 50 up into sleeve 46 to radially expand the latter sufficiently to form a tight, waterproof seal with the interior wall of drainpipe 29. In a preferred embodiment, the outer periphery of end 47 of sleeve 46 is chamfered to provide bevel 77 at an angle that is the negative of the angle of frustum 50 (i.e., if frustum 50 is +5° then the angle of bevel 77 is −5°), thereby insuring that when sleeve 46 is radially expanded, the seal formed is axially quite wide, as shown particularly in FIG. 3. Also, in a preferred embodiment, nuts 70 are locknuts so that once tightened, they can be expected to remain in that condition indefinitely unless manually released. Drain strainer 72 can now be installed by lowering it with rod ends 58 extending through openings 74, and then threading wingnuts 76 onto rod ends 58 and tightening the wingnuts until they firmly contact the body of the drain strainer.

It should be appreciated that the embodiment described is but one form that the present invention may assume. For example, embodiments other than threaded ends 58 and nuts 70 may be provided as means for drawing frustum 50 so that it moves axially to expand sleeve 46. Rods 54 can simply be provided with transverse serrations and a ratchet mechanism, similar to that employed in caulking guns, provided instead. Indeed, one need not use rods to couple frustum 50 to bridge 60 but instead one can employ wires tipped appropriately with a mechanism for pulling the wires through bridge 60 until the frustum expands sleeve 46.

Figure 4:
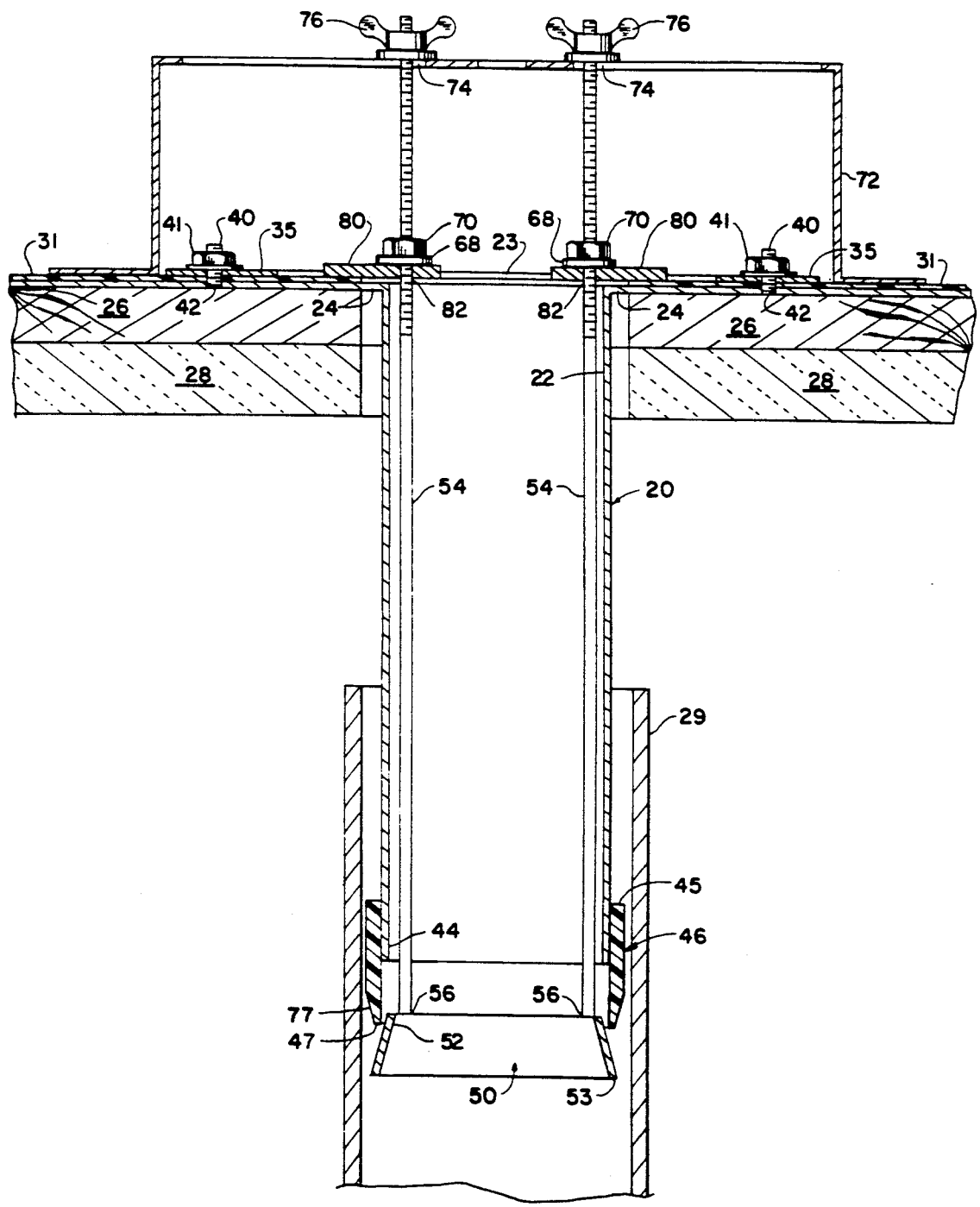
FIG. 4 is a cross-section taken along the long axis of an alternative assembled embodiment of the elements of the present invention.
Figure 5:
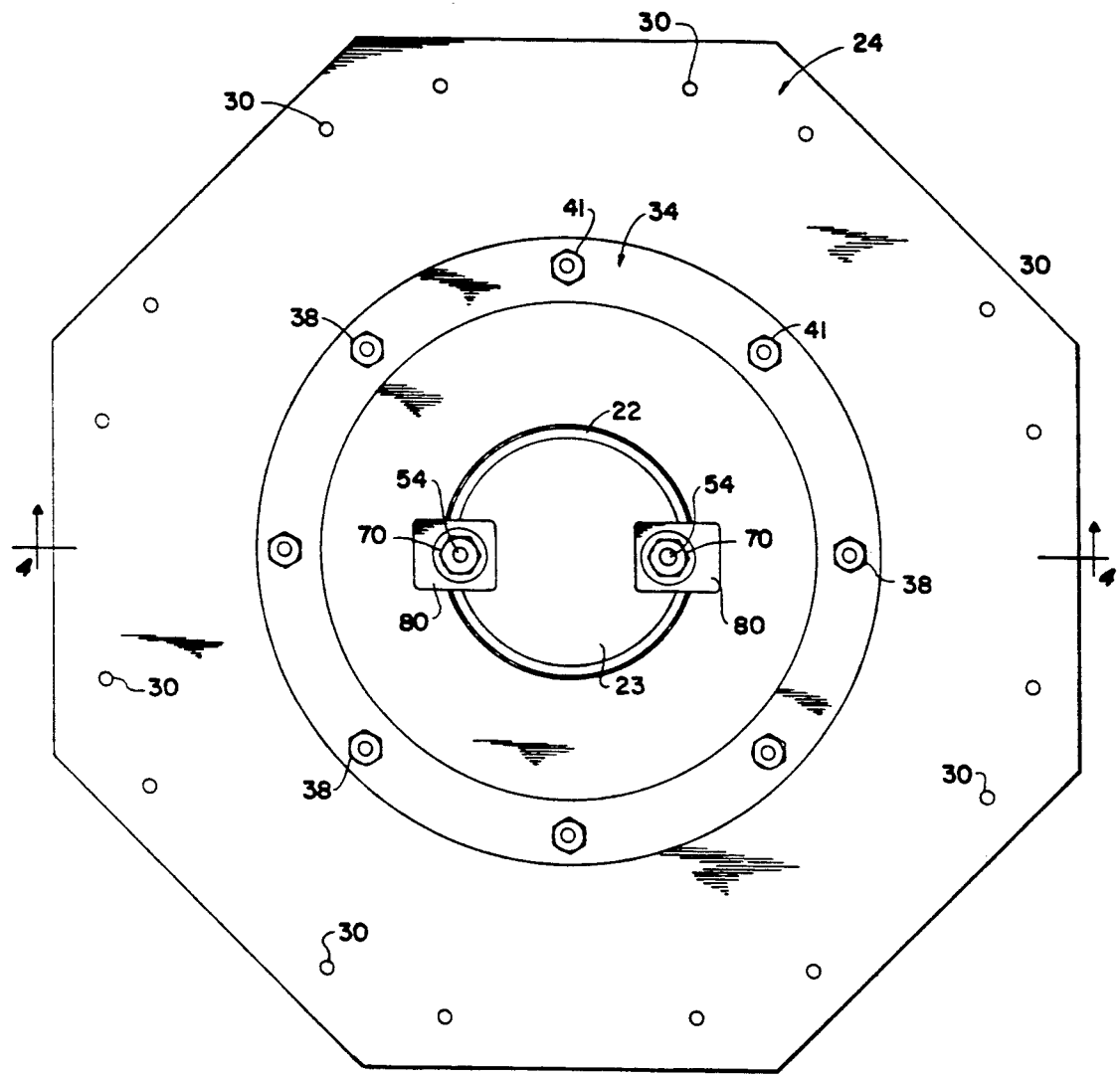
FIG. 5 is a plan view of the top of the assembled embodiment of the present invention shown in FIG. 4.

In yet another embodiment of the present invention, as shown particularly in FIGS. 4 and 5, wherein like numerals denote like parts, bridge 60 has been eliminated and in lieu thereof, there is provided a pair of opposed guide tabs 80 having apertures 82 respectively formed therein. Tabs 80 are formed typically as integral projections from flange 24, extending inwardly across respective portions of inlet end 23 of pipe 22, but can be provided as separate tabs that are welded or otherwise firmly coupled to inlet end 23. Apertures 82 are disposed and dimensioned to accept threaded ends 58 of rods 54 therethrough, so that nuts 70 and associated washers 68 can be tightened along ends 58 so as to bear against tabs 80 and draw sleeve 46 into sealing engagement with the interior wall of drainpipe 29. Ring 34 is shown as being circularly shaped and comprising but a single ring.

Thus, since certain other changes may be made in the above apparatus without departing from the scope of the invention involved, it is intended that all material contained in the above description or shown in the accompanying drawing shall be interpreted in an illustrative and not in a limiting sense.

What is claimed is:

1. Apparatus for sealably connecting an insert pipe of a roof drain insert within a standing drainpipe having an internal diameter relatively larger than the outside diameter of said insert pipe, said apparatus comprising, in combination:

an elastomeric, cylindrical sleeve one end of which surrounds and is seal-bonded to the outside of one end of said insert pipe, a portion of said sleeve extending axially beyond said end of said insert pipe;

a rigid, conical frustum axially movable relative to said insert pipe, said frustum having a smaller end of diameter less than the internal diameter of said sleeve, and a larger end of diameter greater than said internal diameter of said sleeve but less than the internal diameter of said drainpipe;

elongated means, coupled at one end thereof to said frustum and extending axially therefrom; and means for so engaging the other end of said elongated means as to move the latter to draw said smaller end of said frustum axially within said sleeve and into radial contact with the interior of said sleeve so as to distort said portion of said sleeve uniformly and substantially radially.

2. Apparatus as defined in claim 1 wherein said elongated means are dimensioned in length so that when said frustum is positioned adjacent said sleeve, the other end of said elongated means extends outside of the other end of said insert pipe.

3. Apparatus as defined in claim 1 wherein said elastomeric sleeve has a wall thickness slightly less than half the difference between the outside diameter of said insert pipe and said internal diameter of said drainpipe.

4. Apparatus as defined in claim 1 wherein said elastomeric sleeve comprises polyurethane.

5. Apparatus as defined in claim 1 wherein said elastomeric sleeve has about a 50 durometer hardness.

6. Apparatus as defined in claim 1 wherein said rigid, conical frustum has a conical angle of between about 2° and about 45°.

7. Apparatus as defined in claim 1 wherein said rigid, conical frustum has a conical angle of between about 3° and about 10°.

8. Apparatus as defined in claim 1 including a flange connected to and surrounding said other end of said insert pipe and extending substantially perpendicularly to the axis of elongation of said insert pipe.

9. Apparatus as defined in claim 8 wherein said drain insert is intended for use in a roof covered with a membrane, said apparatus including sealing ring means adapted to be installed on said flange encircling said other end of said insert pipe so as to seal said membrane by capture thereof between said flange and said ring means.

10. Apparatus as defined in claim 9 wherein said ring means comprises a pair of concentric rings and means for clamping said membrane between said rings and said flange.

11. Apparatus as defined in claim 1 wherein said elongated means comprises at least a pair of rods respective ends of which are connected diametrically across from one another at the lesser diameter end of and extending parallel to the axis of symmetry of said frustum.

12. Apparatus as defined in claim 11 wherein said rods are connected diametrically across from one another at said lesser diameter end of said frustum.

13. Apparatus as defined in claim 12 wherein said means for engaging said other end of said elongated means comprises the respective other ends of said rods;

bridge means having a portion thereof extending across said other end of said inlet pipe and spaced outwardly therefrom; and means for so coupling said other ends of said rods to said beam as to draw said rods along said inlet pipe and force said frustum to radially expand said sleeve.

14. Apparatus as defined in claim 13 including a flange connected to and surrounding said other end of said inlet pipe and extending substantially perpendicularly to the axis of elongation of said insert pipe; and wherein said bridge means is mounted on said flange.

15. Apparatus as defined in claim 14 wherein said means for coupling comprises threads on said other ends of said rods;

said portion of said bridge means comprising a beam, said bridge means including at least a pair of legs connected at opposite ends of a beam and being mounted on said flange so that said legs straddle said other end of said inlet pipe with said beam extending transversely across said other end of said insert pipe, said beam having at least a pair of openings through which said rods extend; and a pair of nuts mounted on said threads for rotation so as to engage said beam and thereby draw said rods along said inlet pipe and force said frustum to radially expand said sleeve.

16. Apparatus as defined in claim 15 including a hollow, apertured drain strainer for preventing flow of debris into said drainpipe, said drain strainer being mountable above said roof drain insert so as to extend adjacent the periphery of said flange, a center portion of said drain strainer having one or more openings through which said threaded ends of said rods can extend from said bridge; and means engageable with said threaded ends for clamping said drain strainer against said flange.

17. Apparatus as defined in claim 12 wherein said means for engaging said other end of said elongated means comprises the respective other ends of said rods;

at least a pair of tabs repectively affixed adjacent the periphery of said other end of said inlet pipe, each extending inwardly across respective areas of said other end of said pipe; and means for so coupling said other ends of said rods to corresponding ones of said tabs as to draw said rods along said inlet pipe and force said frustum to radially expand said sleeve.

18. Apparatus as defined in claim 14 wherein said means for coupling comprises threads on said other ends of said rods;

said tabs each being apertured to accept a corresponding one of said rods therethrough; and a pair of nuts mounted on said threads for rotation so as to respectively engage a corresponding one of said tabs and thereby draw said rods along said inlet pipe and force said frustum to radially expand said sleeve.

* * * * *